US009187167B2

(12) United States Patent
Sauermann

(10) Patent No.: US 9,187,167 B2
(45) Date of Patent: Nov. 17, 2015

(54) METHOD FOR JOINING TWO FUSELAGE SECTIONS BY CREATING A TRANSVERSE BUTT JOINT AS WELL AS TRANSVERSE BUTT JOINT CONNECTION

(75) Inventor: Axel Sauermann, Helmste-Deinste (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/735,776

(22) PCT Filed: Feb. 11, 2009

(86) PCT No.: PCT/EP2009/051525
§ 371 (c)(1),
(2), (4) Date: Aug. 17, 2010

(87) PCT Pub. No.: WO2009/103635
PCT Pub. Date: Aug. 27, 2009

(65) Prior Publication Data
US 2010/0320321 A1 Dec. 23, 2010

(30) Foreign Application Priority Data

Feb. 20, 2008 (DE) .......................... 10 2008 010 197

(51) Int. Cl.
*B64C 1/06* (2006.01)
*B29B 13/02* (2006.01)
(Continued)

(52) U.S. Cl.
CPC ............... *B64C 1/069* (2013.01); *B29B 13/025* (2013.01); *B29C 65/4815* (2013.01);
(Continued)

(58) Field of Classification Search
CPC .............................. B64C 1/069; Y02T 50/433
USPC .......... 244/131, 132, 123.1, 123.14, 119, 120
See application file for complete search history.

(56) References Cited

U.S. PATENT DOCUMENTS 6,328,261 B1 * 12/2001 Wollaston et al. ............. 244/132
7,159,822 B2 * 1/2007 Grantham et al. ............. 244/119
(Continued)

FOREIGN PATENT DOCUMENTS

CH         278 090        9/1951
CN      101056796 A      10/2007
(Continued)

OTHER PUBLICATIONS

International Search Report for PCT/EP2009/051525, mailed Apr. 28, 2009.
(Continued)

*Primary Examiner* — Brian M O'Hara
*Assistant Examiner* — Keith L Dixon
(74) *Attorney, Agent, or Firm* — Jenkins, Wilson & Taylor & Hunt, P.A.

(57) ABSTRACT

The invention relates to a method of connecting two fuselage sections (1, 2, 21, 22) formed by a fiber-reinforced plastics material, in particular wound fuselage sections (1, 2, 21, 22) for aircraft fuselage cells, having a multiplicity of stringers (10, 11, 35, 36) arranged with a uniform distribution at a distance from and parallel to one another on the inner side of an outer skin (3, 4, 25, 26), with the formation of a transverse joint (5, 30). In order to be able in particular to join together wound CFRP fuselage sections so that simple tolerance compensation is made possible in a continuous, industrial production process, the method according to the invention comprises the following steps: aligning a first and a second fuselage section (1, 2, 21, 22) with respect to one another, heating and adapting at least one transverse butt strap (9, 23), formed by a fiber-reinforced thermoplastic material, in such a way that tolerance compensation between differing cross-sectional geometries of the first and second fuselage sections (1, 2, 21, 22) is made possible, or heating at least one end region (27) of a second fuselage section (2, 22) formed by a fiber-reinforced thermoplastic material, and joining together the two fuselage sections (1, 2, 21, 22).

10 Claims, 3 Drawing Sheets

(51) Int. Cl.
*B29C 65/50* (2006.01)
*B29C 65/00* (2006.01)
*B29C 65/48* (2006.01)
*B29K 71/00* (2006.01)
*B29K 101/12* (2006.01)
*B29K 105/06* (2006.01)
*B29K 307/00* (2006.01)
*B29L 31/30* (2006.01)
*B64C 1/00* (2006.01)

(52) U.S. Cl.
CPC ........ *B29C 65/5042* (2013.01); *B29C 66/1142* (2013.01); *B29C 66/43* (2013.01); *B29C 66/43441* (2013.01); *B29C 66/5221* (2013.01); *B29C 66/721* (2013.01); *B29C 66/7212* (2013.01); *B29C 65/483* (2013.01); *B29C 66/54* (2013.01); *B29C 66/71* (2013.01); *B29C 66/73921* (2013.01); *B29C 66/73941* (2013.01); *B29K 2071/00* (2013.01); *B29K 2101/12* (2013.01); *B29K 2105/06* (2013.01); *B29K 2307/00* (2013.01); *B29L 2031/3082* (2013.01); *B64C 2001/0072* (2013.01); *Y02T 50/433* (2013.01)

(56) References Cited

U.S. PATENT DOCUMENTS

| | | | | |
|---|---|---|---|---|
| 7,823,362 | B2* | 11/2010 | Meyer | 52/713 |
| 7,874,516 | B2 | 1/2011 | Cacciaguerra | |
| 7,938,367 | B2* | 5/2011 | Jarsaillon et al. | 244/131 |
| 8,061,035 | B2* | 11/2011 | Stulc et al. | 29/897.2 |
| 2006/0060705 | A1 | 3/2006 | Stulc et al. | |
| 2009/0266936 | A1* | 10/2009 | Fernandez et al. | 244/119 |

FOREIGN PATENT DOCUMENTS

| | | |
|---|---|---|
| WO | 01/14208 | 3/2001 |
| WO | 2008/029049 | 3/2008 |

OTHER PUBLICATIONS

Chinese Office Action and Search Report for Application No. 200980105815.3 dated Oct. 23, 2012.

* cited by examiner

METHOD FOR JOINING TWO FUSELAGE SECTIONS BY CREATING A TRANSVERSE BUTT JOINT AS WELL AS TRANSVERSE BUTT JOINT CONNECTION

This application is the U.S. national phase of International Application No. PCT/EP2009/051525, filed 11 Feb. 2009 which designated the US and claims priority to German Application No. 10 2008 010 197.4, filed 20 Feb. 2008, and this application claims priority from U.S. Provisional Application No. 61/029,932 filed 20 Feb. 2008; the entire contents of each of the above applications are hereby incorporated by reference.

The invention relates to a method for joining two fuselage sections formed from fibre-reinforced plastics material, more particularly wound fuselage sections for aircraft fuselage cells, with a number of evenly distributed stringers arranged inside on an outer skin parallel to and at a distance from one another to create a transverse butt joint.

Furthermore the invention relates to two embodiments of a transverse butt joint connection between two fuselage sections.

In modern aircraft construction carbon-fibre-reinforced compound component parts (CFRP component parts) are increasingly replacing the standard aluminium alloy materials. Thus by way of example fuselage sections, including the stringers arranged on the inside, are made in one piece in the winding process from carbon fibre reinforced plastics (CFRP). A suitable reinforcing fibre assembly is hereby preferably embedded in the main load direction into a plastics matrix. The plastics matrix can be formed by way of example with thermosetting plastics or mechanically highly stressable thermosoftening plastics. Epoxy resin systems are preferably used as thermosetting plastics whilst polyether ether ketones (PEEK) are used by way of example in the area of the thermosoftening plastics. Carbon fibres, glass fibres, Aramid® fibres, Kevlar® fibres, ceramic fibres or natural fibres are generally used to provide the reinforcing fibre assembly.

One big problem here is combining several CFRP fuselage sections into one fuselage cell because tolerance compensation is no longer possible in the case of solidified CFRP fuselage sections on account of their high inherent rigidity and furthermore the tolerances, particularly with regard to the cross-sectional geometry, during the winding process always turn out as a condition of their functional principle to be considerably greater than in the case of the classic aluminium construction method. These unavoidably higher manufacturing tolerances are a result of inter alia shrinkage processes during the hardening in the autoclave, different reinforcement fibre densities during the laying and winding process, temperature and pressure fluctuations, fluctuations in the quality of the semi-finished fibre products as well as further disturbance variables. Joining together the fuselage sections must however for static reasons in no way take place under mechanical stress.

One possibility for compensating tolerance is to provide additions (so-called "shims") which are introduced in fluid, hardenable and/or solid form into the joining gap between the fuselage sections. These shims can however have a detrimental effect on the mechanical load bearing capacity of the joined fuselage sections and furthermore considerably increase the assembly costs since by way of example fluid, hardenable "shims" require a long hardening time during which the assembled fuselage sections have to be held together in position. Furthermore the use of shims is not permitted in some highly loaded connecting areas for safety reasons.

The object is therefore concerned with the problem of providing a method for joining more particularly wound carbon fibre reinforced plastics fuselage sections which enables a simple tolerance compensation in one continuous industrial manufacturing process.

This is achieved by the following method steps of the patent claim 1:
a) aligning a first and a second fuselage section relative to one another,
b) heating and customizing at least one transverse butt strap formed by a fibre-reinforced thermosoftening plastics material so that a tolerance compensation is possible between deviating cross-sectional geometries of the first and the second fuselage section or heating at least one end area of a second fuselage section which is formed from a fibre-reinforced thermosoftening plastics material, and
c) joining the two fuselage sections together.

According to a first method alternative it is proposed that the two fuselage sections which are to be joined together are preferably formed by a thermosetting carbon fibre reinforced plastics material. The tolerance compensation during joining takes place in this case by heating and in the event of tolerance deviations by the subsequent customizing and remoulding of the transverse butt straps which are used for the final production of the connection and/or stringer couplings which are formed for this purpose by a fibre-reinforced thermosoftening plastics material which is deformable under the influence of heat. The remoulding takes place so that the transverse butt strap contacts the inside of the outer skin of the fuselage section and the stringers at the stringer couplings with the largest possible surface area. The remoulding of the transverse butt straps and/or the stringer couplings takes place as a rule by parallel displacement of at least two rectilinear (end-side) sections in opposite directions to one another, wherein a likewise rectilinear centre section lying between each two relevant sections undergoes a slight incline.

In the case of a second method alternative the two fuselage sections which are to be connected are preferably formed at least at the ends with a wound thermosoftening carbon fibre reinforced plastics material. In order to carry out the method the fuselage sections which are to be joined are aligned relative to one another wherein the tolerance compensation is carried out by heating one of the end sections of the fuselage section which is to be joined. After compensation of the where existing deviations has been carried out between the cross sectional geometries of the fuselage sections being joined by at least section-wise compression and/or expansion of the heated end area of the fuselage section which is to be joined on, the connection of the two fuselage sections is carried out in conventional manner by using additional connecting components.

PEEK (polyether ether ketone) by way of example has proved a suitable thermosoftening plastics material for the carbon fibre reinforced plastics components, more particularly the fuselage sections, the transverse butt straps and the stringer couplings, whilst epoxy resin systems are used for forming the resin matrix in the case of thermosetting carbon fibre reinforced plastics components.

According to an advantageous development of the first method version it is proposed that the fuselage sections are connected by means of the at least one transverse butt strap. This makes it possible to retain the long-known conventional connecting technique of using transverse butt straps placed and fixed on the inside in the transverse butt joint area between two fuselage sections. First any possible tolerance deviations, more particularly a vertical stagger, between the assembled fuselage sections being joined in the area of the transverse butt joint are determined by a suitable measuring system which can take place by way of example with a computer-controlled laser measuring system. Then the transverse butt straps formed from the fibre reinforced thermosoftening plastics material are heated in an electrically heatable moulding tool until a problem-free, distortion-free plastics deformation is possible. Where necessary the transverse butt straps are remoulded and customized to compensate the tolerance between the fuselage sections by means of the moulding tools on the basis of the tolerance deviations determined by the laser measuring system and the actual geometry data of the transverse butt joint respectively. After customizing and remoulding the at least one transverse butt strap the cooled transverse butt strap is removed from the moulding tool and fixedly connected in conventional manner on the inside on both sides to the end areas of the fuselage sections to produce a transverse butt joint. If it is necessary to use several transverse butt straps then to simplify the procedure the transverse butt straps can be heated, remoulded and customized immediately one after the other and then mounted for connecting the fuselage sections. The use of a computer-controlled laser measuring system makes it possible to integrate the method into a fully automatic production line. The at least one transverse butt strap is heated for carrying out the customization and remoulding up to a softening temperature of the thermosoftening plastics material used for forming the matrix. In the case of the thermosoftening high performance plastics material polyether ether ketone (PEEK) which is preferably used, the melting temperature is at 330° C.

According to a further development of the method the at least one transverse butt strap is connected to an end area of a fuselage section by rivets, screws, adhesive, welding or any combination thereof.

Through this development the method according to the invention can be integrated without problem into existing production lines whilst retaining the known joining processes.

A further advantageous development proposes that at least one stringer coupling is heated and customized to enable tolerance compensation.

For this purpose first the existing tolerance deviations between the relevant opposing stringers in the fuselage sections being joined are determined, which can be carried out by way of example again by means of a contactless laser measuring system. The at least one stringer coupling is then placed in a suitable electrically heatable moulding tool and heated. In the moulding tool in the case where tolerance deviations, more particularly a vertical stagger and/or a lateral stagger, are determined between the stringers being joined, the customization and remoulding takes place on the basis of the actual geometry data determined by the measuring system bearing in mind the preset ideal geometry data for an optimum transverse butt joint between the fuselage sections wherein as a rule an attempt is made to minimize and even out the gap measurement on the circumferential side. It is hereby necessary that the at least one stringer coupling is heated at least to the softening temperature of the thermosoftening plastics material used in the individual case, which is preferably a PEEK.

A further development of the second method version proposes that at least one transverse butt strap is connected to an end area of the first fuselage section, more particularly by rivets, screws, adhesive, welding or any combination thereof, the end area of the second fuselage section is heated by an in particular electrically heatable heating element placed in the end area, more particularly a heating mat, and the end area thus heated of the second fuselage section is pushed onto the end area of the first fuselage section.

As a result of this procedure a simple tolerance compensation is possible between the fuselage sections being joined in the area of the transverse butt joint without any further intermediate steps. The heating mat completely encloses the end area of the fuselage section being joined in the circumferential direction so that the entire end area of the second fuselage section being added on can be uniformly heated at the same time. Heating of the end area must hereby take place until at least into the region of the softening temperature of the thermosoftening plastics material of the fuselage sections being used for forming the matrix. A complex measuring system, as in the case of the first method version is not necessary for the tolerance compensation in this method version. The tolerance compensation takes place in the simplest fashion by sliding the heated and thus ductile deformable end area of the second fuselage section which is being joined onto the transverse butt straps of the first fuselage section which have already been fixed on the end area. The end area of the second fuselage section being joined is hereby expanded and/or compressed where required in sections. The second method version is preferably used when producing transverse butt joints which are only slightly mechanically stressed so that as a rule no stringers being connected run in the fuselage sections in the area of the transverse butt joint. The transverse butt joints produced by means of this method version furthermore have the advantage that the outer skins of the fuselage sections adjoin one another stagger-free, that is practically flush in the area of the transverse butt joint.

An advantageous further development of the second method version provides that the end area of the second fuselage section when cooling down shrink-fits onto the at least one transverse butt strap to produce a slight press-fit engagement.

A particularly close-fitting and equally solid seat of the attached second fuselage sections is hereby achieved.

Further advantageous developments of the method and of the transverse butt joint connection are provided in the additional patent claims.

In the drawings the same structural elements each have the same reference numerals.

FIG. 1 shows a perspective sectional view of a transverse butt joint made according to the first method version between two substantially barrel-shaped fuselage sections.

Figure 1:
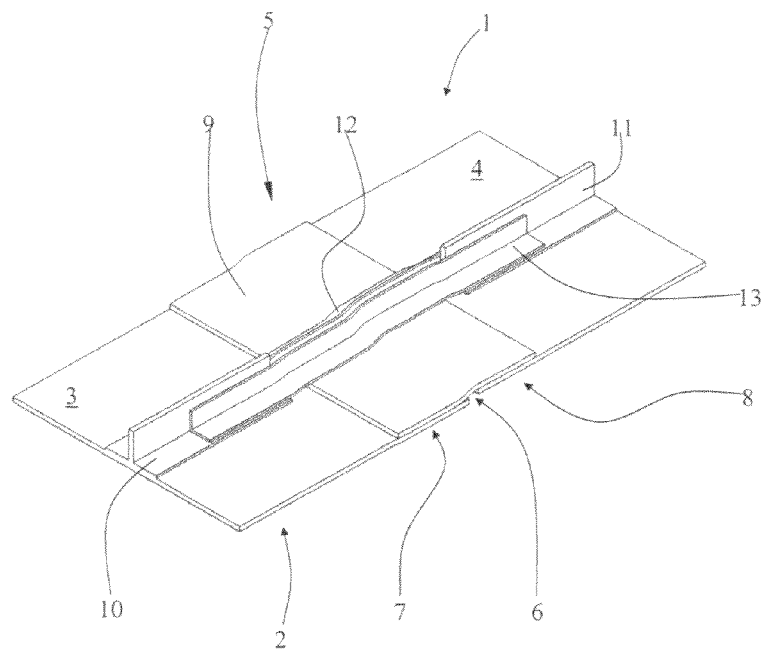
FIG. 1 shows in an isometric view a transverse butt joint made with the first method version between two fuselage sections.

A transverse butt joint 5 is formed with a gap 6 between two fuselage sections 1, 2 with outer skins 3, 4. The two end areas 7, 8 of the fuselage sections 1, 2 are connected by means of a transverse butt strap 9. The stringers 10, 11 which have a T-shaped cross-sectional geometry are fixed opposite one another on the insides (not shown) of the outer skins 3, 4. The stringers 10, 11 are each connected on both sides to a stringer coupling 12, 13 with an L-shaped cross-sectional geometry. The connection of the transverse butt strap 9 to the two outer skins 3, 4 which run roughly up to a butt join as well as the connection of the stringer couplings 12, 13 to the stringers 10, 11 can be carried out by rivets, screws, clamps, adhesive, welding or any combination thereof. The fuselage sections 1, 2 can have in the end areas 7, 8 a cross-sectional geometry which deviates from the ideal circular geometry and can have by way of example an oval, elliptical cross-sectional geometry or practically any other, preferably constantly curved, cross-sectional geometry.

In order to enable remoulding and customization in the heated state for tolerance compensation both the transverse butt strap 9 and the stringer coupling 12, 13 are formed from a fibre-reinforced thermosoftening plastics material which is preferably a carbon fibre reinforced polyether ether ketone (PEEK). Alternatively other thermosoftening high performance plastics with comparable mechanical properties can be used. The remaining components of the fuselage sections 1, 2, more particularly the outer skins 3, 4 as well as the stringers 10, 11 are preferably formed from a fibre reinforced thermosetting plastics material, by way of example from a carbon fibre reinforced epoxy resin system. Alternatively the outer skins 3, 4 and/or the stringers 10, 11 can also be formed from a fibre-reinforced thermosoftening material, such as for example PEEK.

Figure 2:
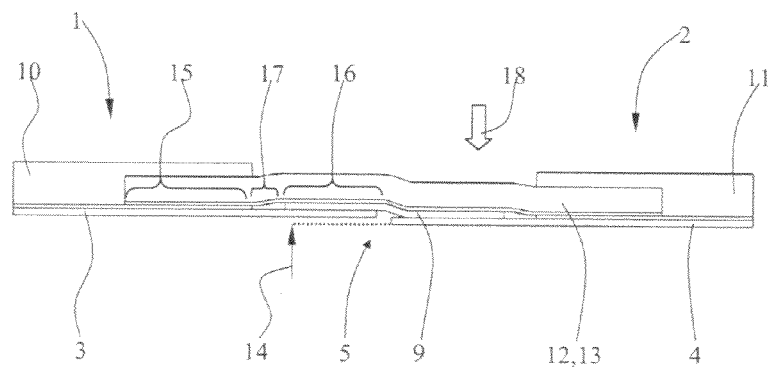
FIG. 2 shows in side view the transverse butt joint according to FIG. 1.

FIG. 2 illustrates a side view of the transverse butt joint 5 in FIG. 1.

A vertical stagger 14 between the outer skins 3, 4 and the stringers 10, 11 has been compensated by remoulding the transverse butt strap 9 and the two stringer couplings 12, 13 which took place in the plastics state. The remoulding of the said component parts takes place in moulding tools (not shown) close to the assembly line of the fuselage sections based on actual geometry data which was determined with a fully automatic measuring system, more particularly a computer-controlled laser measuring system in the area of the transverse butt joint 5 and compared with ideal geometry data in the transverse butt joint area between the fuselage sections 1, 2 to determine the position and absolute amount of any possible tolerance deviations.

The remoulding and customization process of the transverse butt strap 9 and the stringer couplings 12, 13 is to be explained using the example of the front stringer coupling 13. For the purpose of remoulding the front stringer coupling 13 by way of example, a parallel displacement of a rectilinear section 15 of the stringer coupling profile 13 takes place in relation to a further rectilinear section 16 of the stringer coupling 13 wherein an inclined centre section 17 is formed. Where necessary the corresponding procedure follows for the stringer coupling 12 and/or the transverse butt strap 9. Remoulding the said components hereby takes place substantially perpendicular to the outer skins 3, 4, that is in the direction of arrow 18 in the illustrated embodiment.

Figure 3:
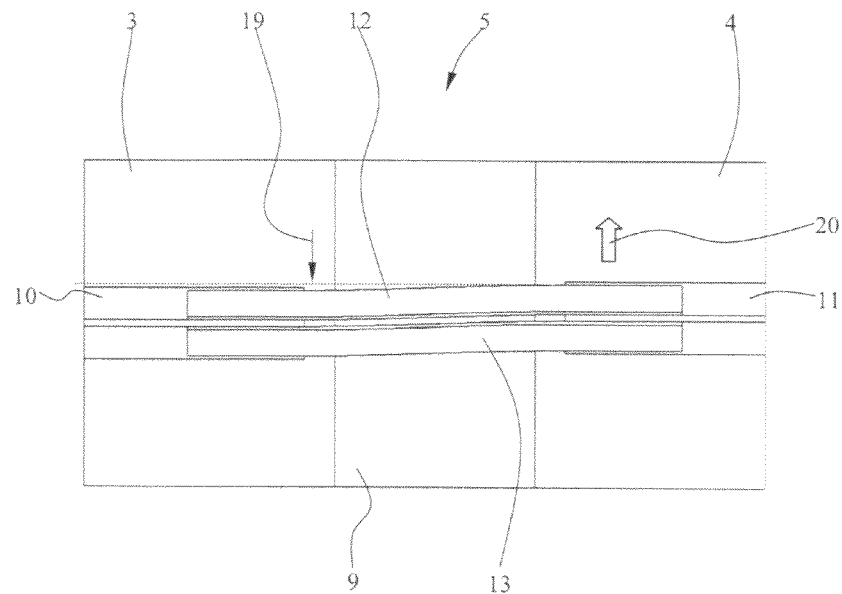
FIG. 3 shows in plan view the transverse butt joint according to FIG. 1.

FIG. 3 shows a plan view of the transverse butt joint 5 with the transverse butt strap 9 according to FIG. 1. Between the stringers 10, 11 there is additionally a transverse stagger 19 between the outer skins 3, 4 which was compensated by remoulding and customizing the stringer couplings 12, 13. The compensation of the transverse stagger 19 takes place corresponding to the procedure for compensating the vertical stagger 14 (see FIG. 2) by remoulding the two stringer couplings 12, 13 transversely to the running direction (longitudinal direction) of the stringers 10, 11 in the direction of arrow 20.

For a description of the method according to the invention according to the first version reference is made to FIGS. 1 to 3.

First the end areas 7, 8 of the fuselage sections 1, 2 which are to be joined are measured by means of a measuring system, preferably by means of a fully automatic computer-controlled laser measuring system in order to determine the actual geometry of the fuselage sections 1, 2 in the area of the transverse butt joint 5. This is followed by aligning the two fuselage sections 1, 2 in relation to one another. Alternatively the alignment can be carried out just on the basis of the measured actual geometry data. By aligning the two fuselage sections 1, 2 it is reached that the tolerance deviations are spread as evenly as possible over the circumference and at the same time are minimized. This means that by way of example at (diametrically) opposite circumferential points of the end area 7 of the fuselage section 2 a distance (not shown) from the corresponding circumferential points of the end area 8 of the fuselage section 1 turns out to be as far as possible the same size in order to make the required tolerance compensation symmetrical over the circumference of the fuselage sections 1, 2.

At least one transverse butt strap 9 is then heated and remoulded and customized by means of an electrically heatable moulding tool so that a complete compensation of any possible vertical stagger 14 between the end areas 7, 8 of the two fuselage sections 1, 2 for tolerance compensation is possible. The control of the moulding tools hereby takes place based on a comparison of the measured actual geometry data with the ideal geometry data of the fuselage sections 1, 2 predetermined by the structural design. The thus remoulded transverse butt strap 9 is then connected to the two end areas 7, 8 of the fuselage sections 1, 2. The connection of the transverse butt strap 9 to the end areas 7, 8 can take place by rivets, screws, clamps, adhesive, welding or any combination of these. The transverse butt joint 5 and thus the joining of the two fuselage sections 1, 2 can be perfected by repeatedly remoulding and customizing further transverse butt straps which may be present.

Following this the stringers 10, 11 arranged at a distance parallel to one another evenly over the circumference inside in the fuselage sections 1, 2 are then each connected preferably by two stringer couplings 12, 13 disposed either side on the stringers 10, 11. Customizing the stringers 10, 11 by heating and subsequently remoulding and adjusting them takes place in the same way as customizing the transverse butt strap 9. Connecting the stringers 10, 11 and the stringer couplings 12, 13 can in turn be carried out by rivets, screws, clamps, adhesive, welding or any combination of these.

The method according to the invention is in the first version dependent on the fact that both the transverse butt strap 9 and also the stringer couplings 12, 13 are formed from a suitable fibre-reinforced thermosoftening plastics material. The remaining components of the fuselage sections 1, 2, particularly the outer skins 3, 4 as well as the stringers 10, 11 fixed therein can also be formed from a fibre-reinforced thermosetting plastics material, such as by way of example a carbon fibre reinforced epoxy resin. The method according to the invention enables a tension-free assembly of large-volumed fuselage sections 1, 2 by providing a possibility for compensation between slightly differing cross-sectional geometries of the fuselage sections 1, 2 in the area of the transverse butt joint.

Figure 4:
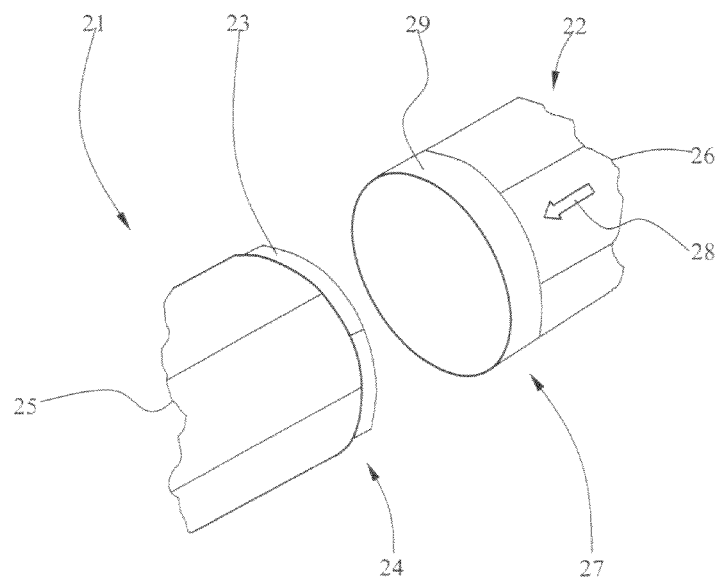
FIG. 4 shows a view of the production sequence for a transverse butt joint connection according to the second method version.

The process sequence of the second version of the method can be seen from FIG. 4. First a first and a second fuselage section 21, 22 are aligned relative to one another. At least the second fuselage section 22 which is to be joined onto the first fuselage section 21 is formed at least in the end area with a fibre reinforced thermosoftening plastics material. By way of example the fuselage section 22 can be formed from a polyether ether ketone (PEEK) with a carbon fibre reinforcement.

At least one transverse butt strap 23 is then fixedly connected to an outer skin 25 on the inside in an end area 24 of the first fuselage section 21.

Finally an outer skin 26 is heated in an end area 27 of the second fuselage section 22 which is to be joined on, and is hereby made sufficiently plastically deformable to allow a tolerance compensation.

By pushing the second fuselage section 22 with the softened end area 27 onto the transverse butt strap 23 in the direction of the arrow 28 the assembling of the two fuselage sections 21, 22 together is completed by simultaneously implementing any tolerance compensation which may be required in a further method step.

For the final connection of the two fuselage sections 21, 22 it is necessary as a rule to fixedly connect the transverse butt strap 23 additionally to the end area 27 of the joined on fuselage section 22 by rivets, screws, adhesive, welding or any combination of these.

For heating the end area 27 a preferably electrically heatable, flexible and circumferential heating mat 29 or sleeve is mounted on same. The heating mat 29 preferably remains on the end area 27 until the second fuselage section 22 has been pushed completely onto the first fuselage section 21. The heating mat 29 enables a slight longitudinal compensation in the radial direction in order to avoid the creation of stresses and to make it easier to remove the heating mat 29 or heating sleeve.

After pushing the second fuselage section 22 onto the first fuselage section 21 the heating mat 29 is removed, and where necessary before cooling the top of the transverse butt joint thus formed can be smoothed over. The optional smoothing can take place by way of example with plates whose geometry corresponds with a desired external geometry of the transverse butt joint area and which are pressed with high contact pressure in the area of the transverse butt joint. In the case where the area of the transverse butt joint is substantially cooled down after removing the heating mat 29 the plates are preferably provided with an integrated electrical heating in order to heat up and smooth the area of the transverse butt joint again at least up to the area of the plasticizing temperature of the thermosoftening fibre reinforced plastics material which is used.

An extensive expensive measuring and precise pre-alignment of the two end areas 24, 27 of the fuselage sections 21, 22 being joined is unlike in the first version of the method no longer required.

In the case where the end area 27 of the second fuselage section 22 being joined has a slightly smaller cross-sectional geometry compared with the first fuselage section 21, after the end area 27 has cooled down and as a result of the shrinkage conditioned by the cooling a slight press-fitting engagement is set between the end area 27 and the transverse butt strap 23 whereby a particularly close-fitting and simultaneously solid seat is guaranteed.

The transverse butt strap 23 is preferably formed from a fibre-reinforced thermosetting material, such as by way of example a carbon-fibre reinforced epoxy resin. The method according to the second version is not provided for producing transverse butt joints in mechanically highly stressed areas of the aircraft fuselage cell so that as a rule no stringers are arranged in the area of the transverse butt joint and thus also no stringer couplings need be provided.

Figure 5:
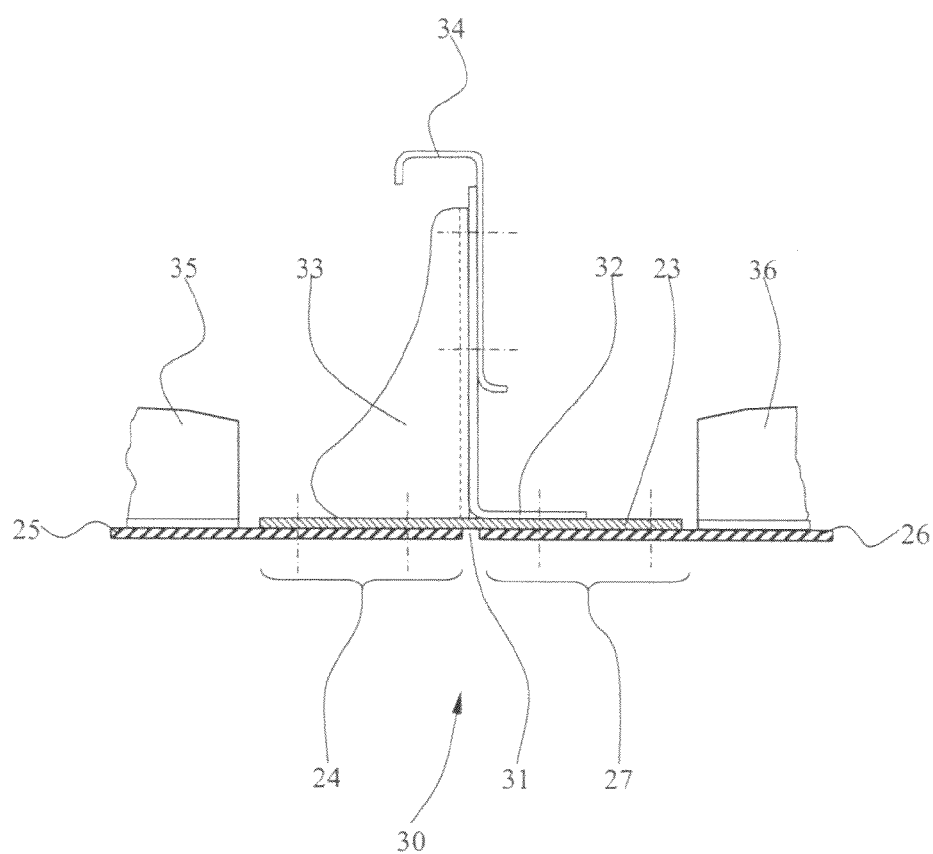
FIG. 5 shows a cross-sectional view of a transverse butt joint formed with the second method version between two fuselage sections.

FIG. 5 shows a cross-sectional illustration through a transverse butt joint formed according to the method according to FIG. 4.

The two outside skins 25, 26 are connected in the end areas 24, 27 by means of the transverse butt strap 23 by providing a transverse butt joint 30. A narrow gap 31 runs between the two outer skins 25, 26. Fastening means such as for example rivets, screws or the like are indicated by the four chain-dotted lines. A lower ring frame profile 32 as well as a clip 33 are furthermore fixed in the end area 27 for laterally supporting the ring frame on the transverse butt strap 23. The lower ring frame profile 32 having a roughly L-shaped cross-sectional geometry is connected to an upper inversely L-shaped ring frame profile 34 by two fastening means, such as rivets, to form an approximately S-shaped cross-sectional geometry. Since the second version of the method is primarily to provide transverse butt joints in weak-load areas of the aircraft fuselage cell the two stringers 35, 36 and stringer couplings are not absolutely necessary nor provided in the area of the transverse butt joint 30.

The two ring frame profiles 32, 34 as well as the clip 33 and the optionally mounted stringers 35, 36 can be formed from any material.

LIST OF REFERENCE NUMERALS

1 Fuselage section (first)
2 Fuselage section (second, to be joined on)
3 Outer skin
4 Outer skin
5 Transverse butt joint
6 Gap
7 End area (first fuselage section)
8 End area (second fuselage section)
9 Transverse butt strap
10 Stringer
11 Stringer
12 Stringer coupling
13 Stringer coupling
14 Vertical stagger
15 Section (stringer coupling)
16 Section (stringer coupling)
17 Centre section (stringer coupling)
18 Arrow
19 Lateral stagger
20 Arrow
21 Fuselage section (first)
22 Fuselage section (second, to be joined on)
23 Transverse butt strap
24 End area (first fuselage section)
25 Outer skin
26 Outer skin
27 End area (second fuselage section)
28 Arrow
29 Heating mat
30 Transverse butt joint
31 Gap
32 Lower ring frame profile
33 Clip
34 Upper ring frame profile
35 Stringer
36 Stringer

The invention claimed is:

1. A method for connecting two fuselage sections formed from a fibre-reinforced plastics material, with a number of stringers arranged uniformly spaced out parallel to one another on an inside of an outer skin to produce a transverse butt joint, the method comprising the steps of:
   a) aligning a first and a second fuselage section relative to one another, b) connecting at least one transverse butt strap to an end area of the first fuselage section, c) only heating at least one end area of the second fuselage section, which is formed from a fibre-reinforced thermosoftening plastics material, until a temperature corresponding at least to a softening temperature of the fibre-reinforced thermosoftening plastics material is reached, d) pushing the at least one heated end area of the second fuselage section onto the transverse butt strap connected to the first fuselage section, e) compensating for tolerances by one or more of expanding or compressing the heated end area of the second fuselage section, and f) joining the two fuselage sections together.

2. The method according to claim 1, wherein the at least one transverse butt strap is connected to each end area of the first and second fuselage sections by at least one of rivets, screws, adhesive, welding.

3. The method according to claim 1, wherein at least one stringer coupling is heated and customized to enable tolerance compensation.

4. The method according to claim 1, wherein each opposing stringer of the first and second fuselage sections is connected to each at least one stringer coupling.

5. The method according to claim 1, wherein stringer couplings are connected to the stringers by at least one of rivets, screws, adhesive, welding.

6. The method according to claim 1, wherein when heating the at least one transverse butt strap and/or at least one stringer coupling a temperature is reached which corresponds at least to the softening temperature of the fibre-reinforced thermosoftening plastics material comprising a carbon fibre reinforced thermosoftening plastics material.

7. The method according to claim 1, wherein the end area of the second fuselage section is heated by an electrically heatable heating element comprising a heating mat mounted at least in the end area.

8. The method according to claim 1 wherein the end area of the second fuselage section when cooling down is shrink-fitted onto the at least one transverse butt strap to produce a press-fit engagement.

9. A transverse butt joint connection between two fuselage sections formed with a fibre-reinforced plastics material, with a number of stringers arranged uniformly parallel to one another spaced out on an inside of an outer skin, with at least one transverse butt strap and a number of stringer couplings, wherein the transverse butt joint is formed by aligning a first fuselage section and a second fuselage section relative to one another, connecting the at least one transverse butt strap to an end area of the first fuselage section, only heating at least one end area of the second fuselage section which is formed from a fibre-reinforced thermosoftening plastics material until a temperature corresponding at least to a softening temperature of the fibre-reinforced thermosoftening plastics material is reached, wherein to enable a tolerance compensation by thermal remoulding and customizing the at least one transverse butt strap and at least one stringer coupling are formed from the fibre-reinforced thermosoftening plastics material comprising a carbon fibre reinforced polyether ether ketone, pushing the at least one heated end area of the second fuselage section onto the transverse butt strap connected to the first fuselage section, compensating for tolerances by one or more of expanding or compressing the heated end area of the second fuselage section, and joining the two fuselage sections together.

10. The transverse butt joint connection according to claim 9, wherein to enable tolerance compensation by heat-conditioned plasticizing at least one of the two fuselage sections is formed from the fibre reinforced thermosoftening plastics material comprising the carbon fibre reinforced polyether ether ketone.

* * * * *